United States Patent [19]

Lewis, Jr.

[11] Patent Number: 4,651,212

[45] Date of Patent: Mar. 17, 1987

[54] SIGNAL OFFSET CIRCUITRY FOR DIGITAL DEGHOSTING SYSTEM

[75] Inventor: Henry G. Lewis, Jr., Hamilton Square, N.J.

[73] Assignee: RCA Corporation, Princeton, N.J.

[21] Appl. No.: 824,665

[22] Filed: Jan. 31, 1986

Related U.S. Application Data

[63] Continuation-in-part of Ser. No. 813,255, Dec. 24, 1985.

[51] Int. Cl.⁴ .......................... H04N 5/21; H04N 5/14
[52] U.S. Cl. .................................... 358/167; 358/160; 358/188; 358/905
[58] Field of Search ................. 358/167, 166, 160, 36, 358/149, 37, 188, 905

[56] References Cited

U.S. PATENT DOCUMENTS

| | | | |
|---|---|---|---|
| 4,275,420 | 6/1981 | Yamada et al. | 358/167 |
| 4,333,109 | 6/1982 | Ciciora | 358/167 |
| 4,517,586 | 5/1985 | Balaban et al. | 358/13 |
| 4,540,974 | 9/1985 | Schanne et al. | 340/347 AD |
| 4,542,408 | 9/1985 | Lewis, Jr. | 358/167 |

*Primary Examiner*—Tommy P. Chin
*Attorney, Agent, or Firm*—E. M. Whitacre; P. J. Rasmussen; K. N. Nigon

[57] ABSTRACT

A digital deghosting system uses the interval between the sixth pre-equalization pulse and the first serration as a training signal to determine the timing and amplitude of ghost signals relative to the desired signal. The system includes level shifting circuitry to change the amplitude of the video signals during the training interval. This amplitude shift ensures that all of the information concerning the ghost signals is within the dynamic range of the analog to digital converter.

4 Claims, 4 Drawing Figures

SIGNAL OFFSET CIRCUITRY FOR DIGITAL DEGHOSTING SYSTEM

This application is a continuation-in-part of co-pending application Ser. No. 813,255, filed Dec. 24, 1985.

The present invention relates to signal offset circuitry for use in a digital deghosting system.

Ghost images can be produced on the screen of a television receiver when both the desired RF signal for a selected channel and time delayed versions of the same RF signal are received by the tuner. The desired and delayed RF signals are demodulated to form desired and delayed video signals from which a main and ghost image is produced. In the case of broadcast channels, delayed RF signals may be produced when the transmitted RF signal is reflected from objects, such as buildings or mountains. In the case of cable channels, delayed RF signals may be produced when the desired RF signal is reflected from improper cable terminations in the cable distribution system. When there are multiple delayed RF signals, as when a transmitted RF signal is reflected by more than one object, multiple ghost images may be produced.

In a typical digital deghosting system, ghost contaminated video signals are digitized by an analog to digital converter (ADC) and delayed by successive stages of a digital delay line. The output signals from respective stages are adjusted in amplitude (or weighted) so that when all of the delayed and weighted signals are combined they form a psuedo ghost signal. The psuedo ghost signal is combined with the ghost contaminated video signals to cancel their ghost signal components.

The amount of delay provided by each stage of the delay line and the factor by which the output signal of each stage is weighted are determined by examining the digitized input signals during a training interval. The input signal provided during the training interval (the training signal) desirably exhibits a substantially constant value for a period of time sufficient to encompass the ghosts of the signals which precede the training signal, a transition or other singularity, and a substantially constant value for a period of time sufficient to include all of the ghosts induced by the transition or singularity.

For signals developed under the NTSC standard the interval between the trailing edge of the sixth pre-equalization pulse and the leading edge of the first serration can serve as an acceptable training signal. This interval includes approximately one-half of a horizontal line period (½H) when the amplitude of the video signal is substantially constant at the black level value (0 IRE), a transition (the leading edge of the vertical synchronization pulse) and an interval of approximately ½H when the amplitude of the video signal is substantially constant at the sync-tip value (−40 IRE). The waveform of this training signal is shown in FIG. 1A.

The ADC's typically used in digital video signal processors digitize the input signals to occupy the full dynamic range of the ADC. Under the NTSC standard, a video signal may occupy a range of values between −40 IRE (sync-tip) and 100 IRE (white level). For a video signal which is digitized by an eight-bit ADC, having a dynamic range from −127 to +127, for example, a white level signal may be converted to a digital value of 120 and a sync-tip signal to a digital value of −120.

The use of substantially all of the dynamic range of the ADC to digitize standard signals may present problems in a digital deghosting system which uses the training signal set forth above. In the exemplary deghosting system described above, the portion of the training signal following the leading edge of the vertical sync pulse and having an amplitude of −40 IRE (sync-tip) is monitored for ghosts of the vertical sync transition to determine the timing, amplitude and polarity of the ghost signals. Since this signal is digitized to have values near the bottom of the dynamic range of the ADC, ghost signal components may cause the analog input signal to have values which are not correctly digitized by the ADC.

FIG. 1B shows an exemplary training signal which includes a positive ghost signal component that is reduced in amplitude by 6 dB relative to the desired signal. At the left margin of FIG. 1B is a scale indicating the digital values corresponding to the analog levels. From this scale it is noted that the −60 IRE amplitude value of the combination of the vertical sync pulse and its 6 dB ghost signal component is outside of the range of values which can be converted by the ADC. Assuming that the ADC converts the values below its range to have digital values of −127, the amplitude of ghost signal shown in FIG. 2 may be seriously underestimated and any additional positive ghost signals superimposed on this ghost signal may be lost entirely. One solution to this problem is to increase the range of analog values which may be represented within the dynamic range of the ADC. This solution is undesirable, however, because it decreases the number of digital values which may be used to represent the image information in the video signal, increasing the quantization distortion of the image.

SUMMARY OF THE INVENTION

The present invention is embodied in circuitry for effectively shifting the level of analog video signals to be used by a digital deghosting system. The circuitry includes a timing circuit responsive to the analog video signals for developing a control signal which defines an interval of time in the analog video signals that includes a training signal. Level shifting circuitry is responsive to this control signal to effectively change the amplitude of the analog video signal during the time interval to allow proper digitization of the training signal by the ADC.

DETAILED DESCRIPTION OF THE INVENTION

Figure 1:
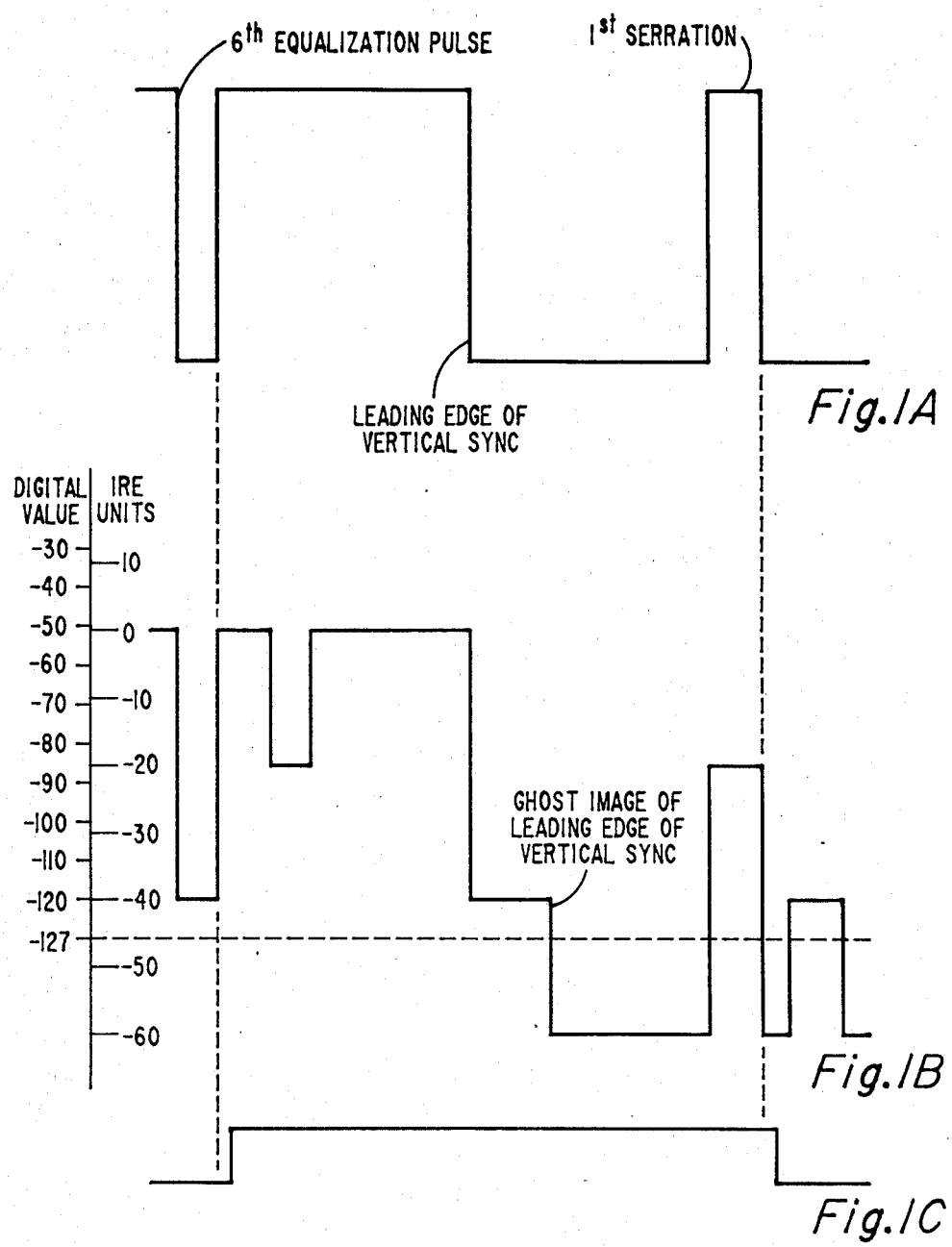
FIGS. 1A, 1B and 1C are graphs of amplitude versus time showing waveforms that are useful for explaining the operation of the embodiment of the invention shown in FIG. 2.

In the drawings, broad arrows represent busses for multiple-bit parallel digital signals and line arrows represent connections carrying analog signals or single bit digital signals. Depending on the processing speed of the devices, compensating delays may be required in certain of the signal paths. One skilled in the art of digital signal processing circuit design would know where such delays would be needed in a particular system.

Figure 2:
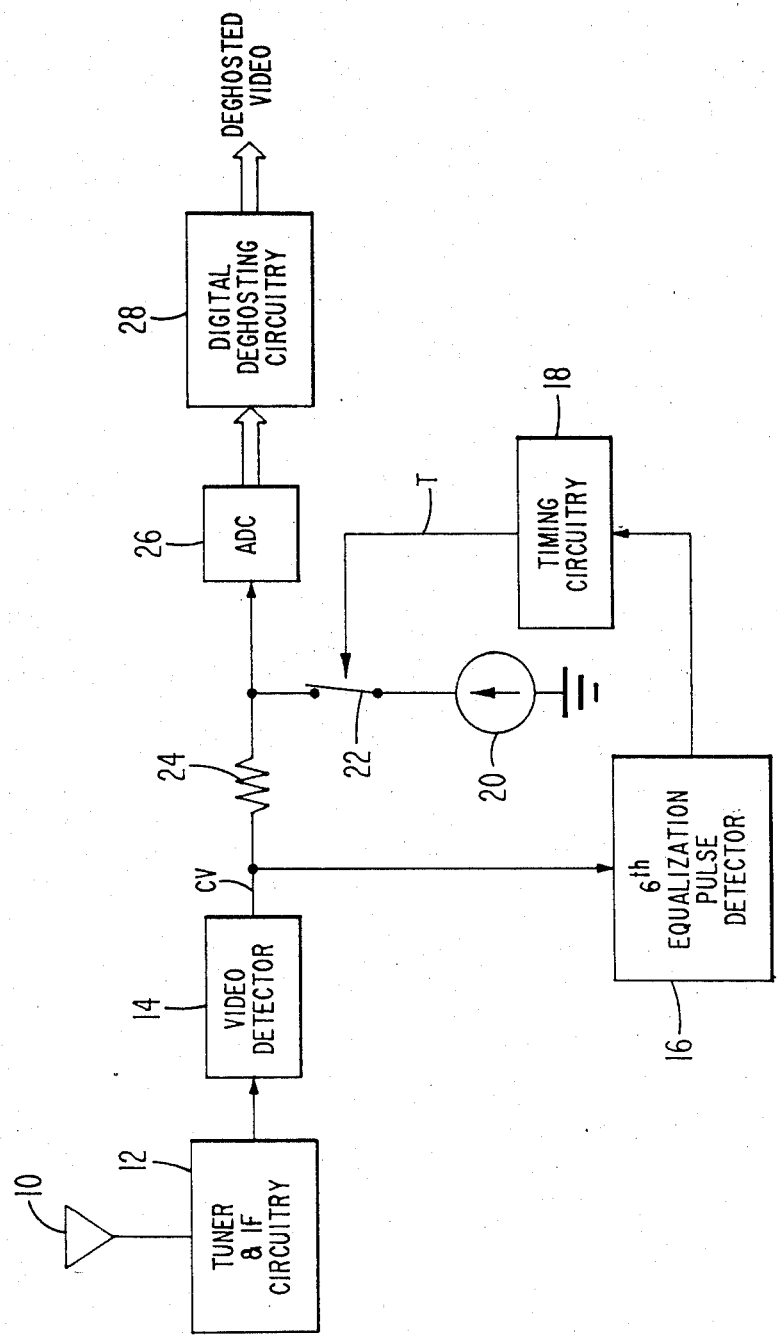
FIG. 2 is a block diagram, partially in schematic diagram form showing a portion of a television receiver embodying the present invention.

In FIG. 2, tuner and IF circuitry 12, which may, for example, include the tuner and intermediate frequency (IF) filtering and amplification circuitry of a conventional television receiver, receives modulated video signals via antenna 10 and provides IF signals representative of the signals from a predetermined channel to a video detector 14. The video detector, which may, for example, include a conventional synchronous detector, provides baseband composite video signals, CV, at its output port to an ADC 26 via a resistor 24.

A detector 16, responsive to the line and field synchronization signal components of the signals CV, detects the last (sixth) pre-equalization pulse preceding the vertical synchronization pulse interval. The detector 16 may, for example, include a counter (not shown) which is enabled during the vertical blanking interval to count pulses in the composite synchronizing signal. The pulses counted during this interval are the pre-equalization pulses. The output signal provided by the counter to the timing circuitry 18 is a pulse which is substantially coincident with the sixth pre-equalization pulse. Timing circuitry 18, which may, for example, include a monostable multivibrator, produces a pulse signal, T, which is in a first state during the training interval (e.g. for one horizontal line period following the trailing edge of the sixth pre-equalization pulse) and is in a second state otherwise. The pulse signal T is illustrated in FIG. 1C. During the training signal interval, the signal T closes a switch 22 conditioning it to apply the current from the current source 20 to the interconnection of the resistor 24 and the ADC 26. The current from source 20 flows through the resistor 24 to develop a positive potential offset at the input terminal of the ADC 26 during the training signal interval. This potential offset changes the amplitude of the video signals applied to the ADC during the training interval so that the ghost images of the leading edge of the vertical sync pulse are converted to distinguishable values within the dynamic range of the ADC 26.

The value of the potential offset is determined by the selection of the resistor 24 and the current source 20. The actual potential offset used in a system depends on the range of potentials which the input signal may occupy. To simplify explanation of the invention, the potential will be described in standard IRE units. One skilled in the art of television circuit design would be able to convert these IRE values into actual potentials for a given system.

ADC 26 converts the video signals applied to its input port into digital values. The digital video signals are applied to digital deghosting circuitry 28 which may, for example, be similar to that shown in U.S. Pat. No. 4,542,408 entitled "Digital Deghosting System" which is hereby incorporated by reference. The deghosted video signals provided by the circuitry 28 may be applied to conventional digital video signal processing circuitry (not shown) to develop a ghost free image on a display device (not shown).

The digital deghosting circuitry 28 may, for example, determine the timing and amplitude of ghost signals by differentiating the training signal. Ideally, the largest pulse in this differentiated signal corresponds to the leading edge of the vertical sync pulse and any subsequent pulses correspond to ghost images of the vertical sync pulse. The timing of the ghost signals relative to the desired signal can be determined from the delay between the largest pulse in the differentiated signal and each of the smaller subsequent pulses. Similarly, the relative amplitude of each of the ghost signals to the desired signal can be determined as the relative amplitude of each of the smaller pulses to the largest pulse.

If the offset added to the training signal at the input to the ADC has a sufficient magnitude, the steps in the digitized training signal and, consequently, the pulses in the differentiated signal will have the amplitude values which correspond to the respective ghost signals. While an offset of from 20 IRE to 40 IRE may result in adequate deghosting of many ghost-contaminated signals, a larger offset may be desirable to compensate for possible nonlinearities in the ADC and to improve the performance of the deghosting circuitry for noisy signals.

A nonlinear ADC, as used in this application, is one which has varying quantization resolution over its dynamic range. Stated another way, a nonlinear ADC translates a given analog difference value into various digital difference values depending on where in the dynamic range of the ADC the analog difference value lies. An ADC which is nonlinear near the bottom end of its dynamic range may be acceptable for use in a digital television receiver that does not include deghosting circuitry because the portions of the video signal having values in this region (i.e. the synchronization pulses) contain relatively small amounts of information. In the digital deghosting system set forth above, however, the portion of the training having a nominal value of sync-tip has all of the ghost signal information. If, for example, the quantization resolution in the range of values occupied by sync pulses is more coarse than in the range of values occupied by active video signals, the deghosting system may overcompensate for the ghost signal components in the video signals it processes and introduce ghost signals of opposite polarity. This type of error can be corrected by using the present invention to shift the training signal into the range of values occupied by the active video signals before it is digitized. In the system described above, a shift of from 60 to 80 IRE would be sufficient for this purpose.

Depending on the structure of the ghost detecting circuitry used in the deghosting system, it may be difficult to distinguish between impulse noise in the training interval and ghost signals. Ghost detecting circuitry which differentiates the training signal, for example, produces pulses corresponding to ghost images of the leading edge of vertical sync. This differentiation operation will also produce pulses corresponding to noise impulses in the training interval. Some of these noise pulses may be eliminated by conditioning the ghost detecting circuitry to ignore pulses having amplitudes greater than the sync-tip value (40 IRE). Since ghost signals occurring in the training interval are images of the leading edge of vertical sync, they should not have differential amplitudes greater than 40 IRE.

To distinguish between large amplitude impulse noise and ghost signals, the offset used for the ADC is desirably large enough to prevent the noise pulses fro being clipped at or below the sync tip value. Since both positive and negative noise impulses may contaminate the video signals, it may be desirable to select an offset value to position the sync tip value in the center of the dynamic range of the ADC. In the present embodiment, for example, this offset value is 70 IRE.

Although the present embodiment of the invention develops an offset potential by adding current to the analog input signals, it is contemplated that other means may be used to change the correspondence between the analog signals and the digital values developed by the ADC. For example, the potential reference used by the ADC to develop reference input signals for its comparators may be selectively shifted during the training interval to change the correspondence between the analog input values and digital output values by an amount equivalent to a desired offset potential.

What is claimed is:

1. Apparatus comprising:
   an input terminal for applying analog video signals having desired and delayed desired (ghost) signal components, each including synchronizing signal components;
   means coupled to said input terminal for developing a control signal corresponding to a predetermined interval of said analog video signals which includes a portion of the synchronizing signal components of said desired signals;
   an analog to digital converter coupled to said input terminal for developing digital samples representing said analog video signals;
   means, coupled to said analog to digital converter and responsive to said control signal for changing the correspondence between said analog video signals and said digital samples during said predetermined interval; and
   digital deghosting circuitry responsive to the samples provided by said analog to digital converter during said predetermined interval for determining the amplitude and timing of said ghost signal components relative to said desired signals to produce a deghosted video signal.

2. The apparatus set forth in claim 1 wherein said means for changing the correspondence between said analog video signals and said digital samples includes:
   a source of predetermined current;
   a resistor having a predetermined resistance coupled between said input terminal and said analog to digital converter; and
   switching means having a control electrode coupled to said control signal and a primary conduction path coupled between said predetermined current source and the interconnection of said resistor and said analog to digital converter for selectively applying said predetermined current to said interconnection during said predetermined interval.

3. The apparatus set forth in claim 2 wherein said control signal developing means includes:
   means coupled to said input terminal for developing a pulse signal substantially coincident with the sixth pre-equalization pulse;
   means coupled to said pulse signal developing means for generating said control signal being in a first state for one line period following the occurrence of said pulse signal and in a second state otherwise.

4. The apparatus set forth in claim 1 wherein:
   the digital samples developed by said analog to digital converter may occupy a predetermined range of values; and
   said means for changing the correspondence between said analog video signal and said digital samples effectively changes the values of digital samples representing said synchronizing signal components to have values approximately in the center of said range.

* * * * *